United States Patent
Burg et al.

(10) Patent No.: US 9,160,860 B2
(45) Date of Patent: *Oct. 13, 2015

(54) VOICE-MESSAGING WITH ATTACHMENTS

(71) Applicant: AT&T Intellectual Property II, L.P., Atlanta, GA (US)

(72) Inventors: Frederick Murray Burg, West Long Beach, NJ (US); John F. Lucas, Tinton Falls, NJ (US); Vivian A. Pressley-Harris, Willingboro, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/274,044

(22) Filed: May 9, 2014

(65) Prior Publication Data

US 2014/0248859 A1 Sep. 4, 2014

Related U.S. Application Data

(63) Continuation of application No. 13/921,699, filed on Jun. 19, 2013, now Pat. No. 8,761,357, which is a continuation of application No. 13/303,295, filed on Nov. 23, 2011, now Pat. No. 8,494,125, which is a continuation of application No. 12/316,743, filed on Dec. 16, 2008, now Pat. No. 8,085,908, which is a continuation of application No. 11/725,432, filed on Mar. 19, 2007, now Pat. No. 7,466,803, which is a continuation of application No. 10/045,443, filed on Nov. 9, 2001, now Pat. No. 7,212,614.

(51) Int. Cl.
*H04M 3/53* (2006.01)
*H04W 4/12* (2009.01)
*G06Q 30/02* (2012.01)
*G06Q 50/24* (2012.01)
*H04M 3/533* (2006.01)

(52) U.S. Cl.
CPC ......... *H04M 3/5307* (2013.01); *G06Q 30/0225* (2013.01); *G06Q 50/24* (2013.01); *H04M 3/533* (2013.01); *H04M 3/53333* (2013.01); *H04W 4/12* (2013.01); *H04M 2201/39* (2013.01); *H04M 2201/60* (2013.01)

(58) Field of Classification Search
CPC .............................. H04M 3/5307; H04W 4/12
USPC .................. 370/401; 379/88.1, 88.13, 88.18; 455/413; 709/206
See application file for complete search history.

(56) References Cited

U.S. PATENT DOCUMENTS 5,572,576 A 11/1996 Klausner et al.
5,677,739 A 10/1997 Kirkland
(Continued)

OTHER PUBLICATIONS

RFC 2396; T. Berners-Lee, et al.; Standards Track URI Generic Syntax (Aug. 1998); pp. 1-36.

*Primary Examiner* — Gerald Gauthier
(74) *Attorney, Agent, or Firm* — Chiesa Shahinian & Giantomasi PC

(57) ABSTRACT

A network method for using a network telephone voice-mail service, by which a caller may leave a voice-message that includes the identification of an attachment, which may include, as examples only, audio, video, text, programs, spreadsheets and graphic attachments. A video, text, spreadsheet or graphic attachment may be converted to an audible attachment to the voice-mail at the caller's or the voice-mail subscriber's request. Such entries may be made, after receiving an automated prompt for leaving an attachment identifier or conversion request, audibly or by using a keypad entry. A network method is also provided for using a network telephone voice-mail service, by which the voice-mail service may detect an attachment to a voice-mail message and provide access to the attachment to the voice-mail message.

20 Claims, 3 Drawing Sheets

(56) References Cited

U.S. PATENT DOCUMENTS

| | | | |
|---|---|---|---|
| 5,719,922 A * | 2/1998 | Bremer et al. | 379/88.13 |
| 5,805,671 A * | 9/1998 | Ohuchi | 379/88.1 |
| 6,014,427 A * | 1/2000 | Hanson et al. | 379/67.1 |
| 6,222,909 B1 | 4/2001 | Qua et al. | |
| 6,304,573 B1 * | 10/2001 | Hicks, III | 370/401 |
| 6,438,585 B2 | 8/2002 | Mousseau et al. | |
| 6,459,774 B1 | 10/2002 | Ball et al. | |
| 6,516,051 B2 | 2/2003 | Sanders | |
| 6,532,230 B1 | 3/2003 | Lung et al. | |
| 6,775,557 B2 | 8/2004 | Tsai | |
| 6,778,644 B1 | 8/2004 | Jenkins et al. | |
| 6,901,255 B2 | 5/2005 | Shostak | |
| 6,990,514 B1 * | 1/2006 | Dodrill et al. | 709/206 |
| 7,003,083 B2 | 2/2006 | Kovales et al. | |
| 7,212,614 B1 * | 5/2007 | Burg et al | 379/88.18 |
| 7,444,375 B2 | 10/2008 | McConnell et al. | |
| 7,460,654 B1 | 12/2008 | Jenkins et al. | |
| 7,466,803 B2 | 12/2008 | Burg et al. | |
| 7,493,269 B2 | 2/2009 | Fostick et al. | |
| 7,685,005 B2 | 3/2010 | Riff et al. | |
| 7,930,357 B2 | 4/2011 | Malik | |
| 8,085,908 B2 | 12/2011 | Burg et al. | |
| 8,108,542 B2 | 1/2012 | Connelly | |
| 8,219,069 B2 | 7/2012 | Yach et al. | |
| 8,374,585 B2 | 2/2013 | Helferich | |
| 8,494,125 B2 | 7/2013 | Burg et al. | |
| 2003/0083934 A1 | 5/2003 | Fostick et al. | |
| 2007/0286363 A1 | 12/2007 | Burg et al. | |
| 2009/0103692 A1 | 4/2009 | Burg et al. | |
| 2012/0069973 A1 | 3/2012 | Burg et al. | |
| 2013/0279667 A1 | 10/2013 | Burg et al. | |
| 2014/0248859 A1 * | 9/2014 | Burg et al. | 455/413 |

* cited by examiner

VOICE-MESSAGING WITH ATTACHMENTS

RELATED APPLICATIONS

This application is a continuation of U.S. patent application Ser. No. 13/921,699 filed Jun. 19, 2013, which is a continuation of U.S. patent application Ser. No. 13/303,295 filed Nov. 23, 2011, and issued as U.S. Pat. No. 8,494,125 on Jul. 23, 2013, which is a continuation of U.S. patent application Ser. No. 12/316,743 filed Dec. 16, 2008, and issued as U.S. Pat. No. 8,085,908 on Dec. 27, 2011, which is a continuation of prior U.S. patent application Ser. No. 11/725,432 filed Mar. 19, 2007, and issued as U.S. Pat. No. 7,466,803 on Dec. 16, 2008, which is a continuation of prior U.S. patent application Ser. No. 10/045,443, filed Nov. 9, 2001, and issued as U.S. Pat. No. 7,212,614 on May 1, 2007, the disclosures of which are herein incorporated by reference in their entirety.

FIELD OF THE INVENTION

The invention relates to the field of voice-messaging. In particular, the invention provides voice-messaging with file attachments that may include, but are in no way limited to, audio, video, text and graphics.

BACKGROUND OF THE INVENTION

As society becomes increasingly more information-dependent, it is becoming imperative, both for business and personal reasons, to provide and even receive information immediately and conveniently, whereby "convenience" is measured by the various media by which the information may be shared. A prominent implementation of such immediate and convenient information dissemination includes electronic-mail (hereafter referred to as "e-mail"), which is the transmission of memos and messages, including text memos and messages, over a network. E-mail may be sent to a single recipient or broadcast to multiple users. E-mail messages may be sent to a simulated mailbox in the network mail server or host computer until the individual messages are interrogated and deleted. Further, text e-mail memos and messages may include file attachments that may include additional text, audio, video, programs, spreadsheets, graphic attachments, etc.

But, even though e-mail messaging has become a tremendously popular and common method of communications, e-mail usage still has not surpassed telephone usage, particularly in view of the surging popularity and sophistication of mobile telephone systems. However, telephone voice-messaging systems, associated with both PSTN-based (public switched telephone network) and wireless telephone systems, do not have the ability to provide users with voice-message attachments, which may include, but not be limited to, further audio messages, video, text, programs, spreadsheets, graphic attachments, etc.

Processing of potential attachments to either e-mail or voice-mail has become more sophisticated including conversion of, for example, video to text and graphic attachments to their basic components. In the art of video—in particular, video transmission of movies—it is known from U.S. Pat. No. 5,677,739 to provide an audible description of video scenes and action for the sight-impaired. This video-to-audio conversion capability would be especially useful in a voice-mail environment. Moreover, research has been performed at AT&T in the art of breaking displayable objects into their components for representation or audio description. For example, a logo used in a letterhead may be described audibly to a voice-mail user in addition to the letter being read via known text to speech conversion. Consequently, there is both a need and an opportunity to provide more meaningful attachments of various media to voice messages.

SUMMARY OF THE INVENTION

Therefore, the present invention provides a novel network method for using a telephone voice-mail service, by which a caller may leave a voice-message that includes the identification of an attachment, which may include, as examples only, audio, video, text, documents created by word processing programs, documents stored in a markup language (including HTML or XML), programs, spreadsheets, and graphic attachments. Such entries may be made, after receiving an automated prompt for leaving an attachment identifier, audibly or by using a keypad entry. Such a keypad may include, as examples, a telephone keypad, a computer keyboard or even a computer touch-screen.

When the voice-mail subscriber for whom the message is intended accesses the voice-mail service, by telephone, mobile unit or even computer, to retrieve the voice-message, an indication is given that an attachment identification has been included with the voice-mail message. The indication may further include the type and format of the attachment, for example, audio (way or MP3), video (avi), text (txt), word processing documents (doc), documents stored in a markup language (HTML or XML), programs (exe), spreadsheets (xls), or graphic (jpeg or mpeg) attachments.

The voice-mail subscriber may then designate the means by which the attachment is retrieved. The mechanisms available for the voice-mail subscriber to retrieve the voice-message attachment depend upon whether the voice-mail service is an Internet-based or PSTN-based system. For example, if the voice-message attachment identifier is a uniform resource locator (hereafter referred to as a "URL") for an internet web-site, the voice-mail subscriber may use any of the telephone keypad, computer keyboard or computer touchscreen to request that the URL or the associated content be sent to the voice-mail subscriber's e-mail address. A uniform resource locator is a commonly employed means of identifying a resource. However, uniform resource identifier (URI) will be used in the specification and claims defining a generic syntax for a compact string of characters for identifying an abstract or physical resource where the resource need not be network accessible. The URI may be classified as a locator, a name or both and is intended to capture future or later developed resource identifiers. Presently, URI is intended to include but not be limited to the following existent terms known in the art: uniform resource locators (URL), relative uniform resource locators, uniform resource names and universal resource locators. For example, the uniform resource name has been recently developed to be globally unique and persistent even when the resource ceases to exist or becomes unavailable. So while a URL may locate a physical resource, the URI may identify an abstract resource. Other examples of uniform resource identifier may be developed for application in the internet and should be deemed to be included within the term as used in the specification and claims.

A resource request may even be made verbally. For example, one may refer to resources such as "my dental records" or "today's weather forecast for Washington, D.C. and vicinity." In accordance with the present invention, these may be located or a barge-in announcement may be provided to indicate that the resource cannot be located without further input (for example, the identity of the dentist). As another example, the voice-mail subscriber may request that a text attachment be transmitted by facsimile. In addition to e-mail and facsimile transmission, other manifestations of the voice-message attachment may include realtime display on a computer screen, mobile telephone, personal digital assistant (hereafter referred to as a "PDA") or other handheld device by which the voice-mail subscriber has accessed the voice-mail system and having a text, video or graphics attachment or even a multimedia attachment converted to speech for direct play to the requesting subscriber.

It should be noted that there are no limitations to the permutations by which the voice-message attachment may be transmitted to the voice-mail system subscriber. That is, for example, upon request by the subscriber, audio, video, text, programs, spreadsheets, and graphic attachments may be transmitted by e-mail; text, programs, spreadsheets, and graphic attachments may be transmitted by facsimile; audio, video, text, programs, spreadsheets, and graphic attachments may be transmitted in real time to a computer screen, mobile telephone, PDA or other handheld device by which the voice-mail subscriber has accessed the voice-mail system. Further still, if the attachment is in video form, it may be possible to transmit the audio portion thereof, an audible description of the video scenes and action, or both, especially if the voice-mail subscriber has access only to a telephone. The narration of the video may be provided in accordance with existing services for visually impaired people in non-telephony arts. Similarly, if the attachment includes a word processing document or a document in a markup language, the attachment may be processed to extract the text portions, which may then be transmitted to the voice-mail system subscriber through any of the means previously described or an embedded graphics item verbally described.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the foregoing and following written disclosure focus on disclosing example embodiments of this invention, it should be clearly understood that the same is by way of illustration and example only and the invention is not limited thereto. The spirit and scope of the present invention are limited only by the terms of the appended claims.

DETAILED DESCRIPTION OF THE INVENTION

Before beginning a detailed description of the invention, it should be noted that, in the detailed description to follow, example embodiments and values are given, although the present invention is not limited thereto. Further, while the example embodiments of the present invention described below rely on elements of a public switched telephone network (PSTN), other embodiments are possible which do not rely so upon such elements. For example, the invention may be implemented within a system based on Voice-over-Internet protocol (VoIP) technology.

Figure 1:
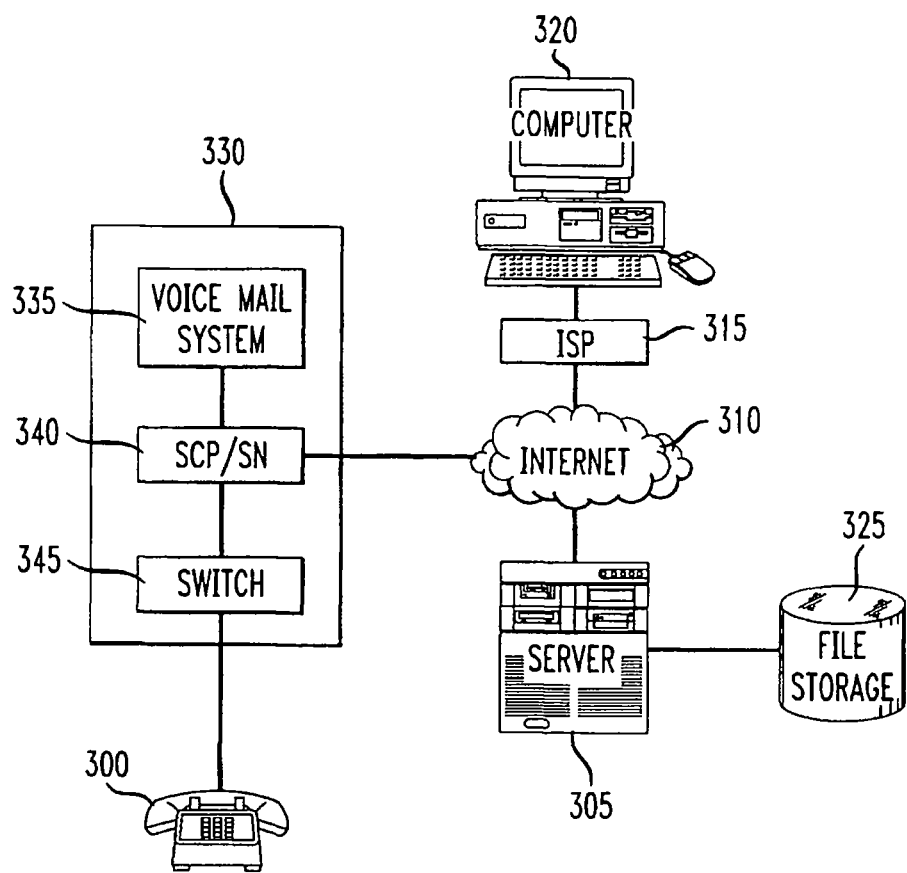
FIG. 1 is a schematic diagram showing the external and internal network environments utilized by example embodiments of the present invention.

FIG. 1 shows an exemplary architecture of a system that may implement the present invention. System 330 may represent a public network in which a voice-mail system 335 may be included. The public network may also include a switch 345 and Service Control Point (SCP)/Service Node (SN) 340. In place of a public network, the System 330 could comprise a PBX (not shown) having a voice-mail system. The present invention is not limited to the location of the voice-mail system 335. Voice-mail system 335 may store an attachment to a voice-mail message or, in the alternative, an address of where the voice-mail attachment may be found, e.g., at File Storage System 325. Telephone 300 is used by a caller when leaving a voicemail message. Telephone 300 may also be used by a user retrieving such voice-mail messages. Similarly, computer 320, Internet Service Provider (ISP) 315, Internet 310 and server 305 may also be used by both the caller and the called party, as will be described in conjunction with FIGS. 2 and 3, respectively.

Figure 2:
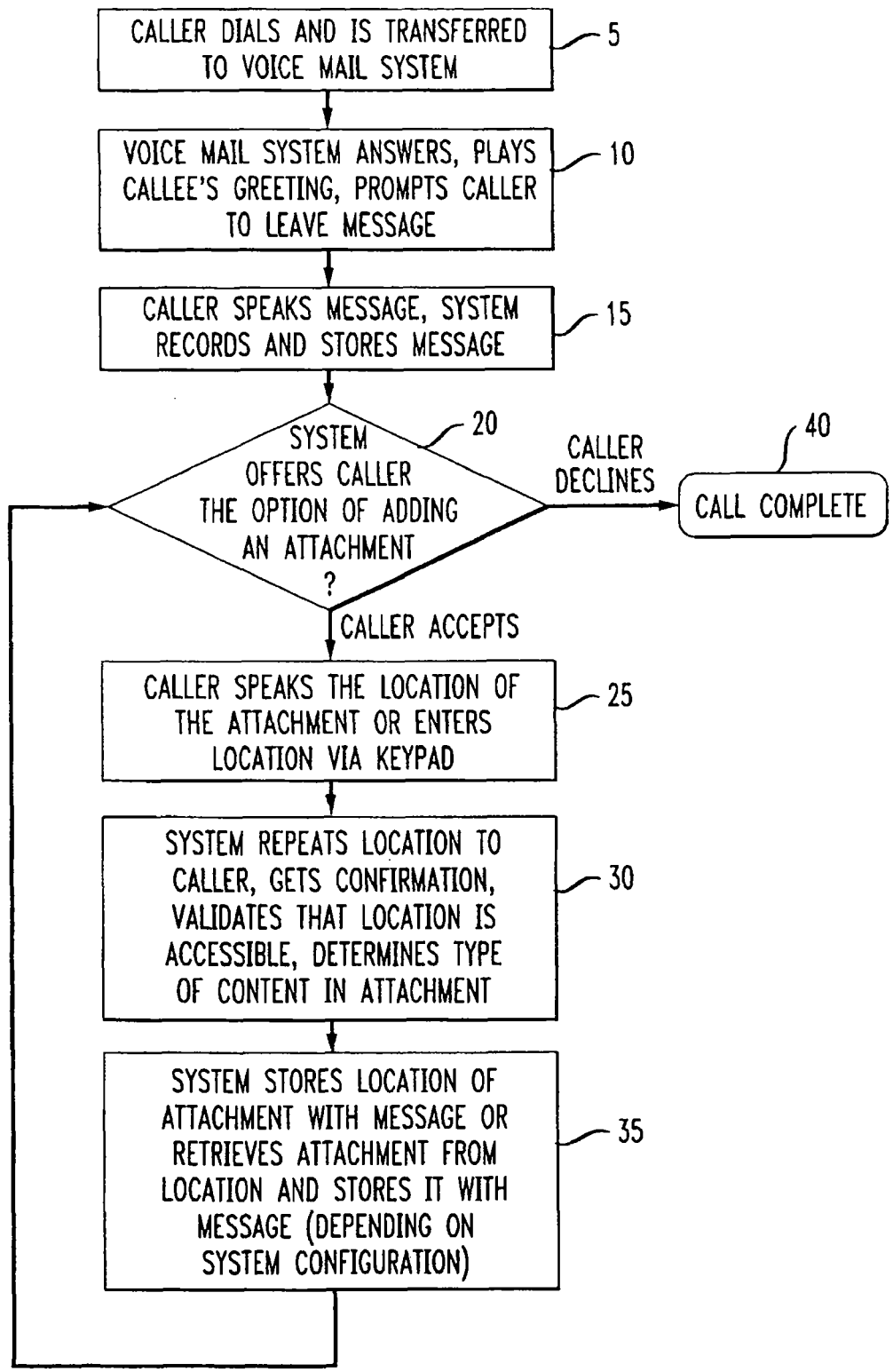
FIG. 2 is a flowchart showing the process for leaving a message according to an example embodiment of the present invention.

The method of the present invention will be described with reference to the flow charts of FIGS. 2 and 3, which respectively describe the process for leaving voice-mail messages with attachments and retrieving voice-mail messages with attachments. Implementation of an example embodiment of the present invention begins with step 5 in FIG. 2, whereby a caller/calling party (hereafter referred to as the "caller") dials an intended/called party using, for example, any one of a telephone, whether wired or wireless, or computer or any other terminal used for telephony purposes.

For the purposes of explaining the present invention, it is assumed that the intended/called party (hereafter referred to as the "called party") is a subscriber to a voice-mail system. Further, the voice-mail system may be a PSTN-based system that is provided by a telephone service provider or it may be based within a private branch exchange (hereafter referred to as "PBX"), which includes private telephone systems within a business enterprise, for example. The telephone network, whether public or private, is depicted in FIG. 1 as block 330.

After the network-based voice-mail system 335, which is part of the telephone network 330, answers the call with an automated message that prompts the caller to leave a message in step 10, the caller may leave a verbal message which is recorded and stored in a voice-mail system's storage, which is well-known in the art of voice-messaging, or simply await the prompt for further options without leaving a verbal message.

The automated voice-mail system message that prompted the caller to leave a message may request the caller to end the message by pushing a designated key, which may include, for example, the "#" or "1" button on a telephone touch pad, computer keyboard or computer touch-screen. Upon not receiving the signal corresponding to the designated key, or upon detection of a predetermined amount of silence—for example three seconds—without detecting that the caller has hung-up or otherwise terminated the call, the voice-mail system may proceed to step 20 by playing another automated message that offers the caller the option of adding an attachment to the voice-mail message.

If the caller does not desire or otherwise intend to leave such an attachment, the caller may hang up the telephone or otherwise terminate the connection, as in step 40. However, if the caller desires to leave an attachment to the voice-mail message, in step 25 the caller may either verbally enter the location of the attachment or enter the location of the attachment using a keypad, which may include, for example, a telephone keypad, a computer keyboard or a computer touchscreen, corresponding to the telephone means utilized by the caller. In one example, the caller may describe a uniform resource identifier by saying "Attach my dental records," initiating a dialog with the system regarding location of the requested resource and an anticipated security exchange to obtain release of the dental records from an identified dentist. A requested resource may be abstract and not presently exist and identifiable only by a uniform resource name. The attachment "location" or "address" entered by the caller, in step 25, which identifies the location of the attachment may include, for example, a uniform resource locator (URL) (e.g., the character string www.att.com/voice_mail/fburg/War_And_Peace.pdf), whose construction is well-known in the art. The URL may include an IP (Internet Protocol) address, which in turn may include or be translatable to, but is not limited to, an IPv4- or IPv6-address, or a fully qualified domain name. The attachment location may also include a non-Internet address. Alternatively, the location or address of the attachment that is entered by the caller may include an address of a document or other file attachment that is stored in a public or private network or document storage system (for example, the dental records example above stored in private dental files). The identification of the location of the attachment may be performed by any one of spelling out the location (which may include a URL) by voice, by speaking the location's constituent words, by entering the location using a keypad, by choosing from a menu of documents previously stored by the caller, or by other similar means.

Since the location or address of the attachment may be entered verbally, the voice-mail system may include voice-recognition software. Accordingly, the voice-mail system may store the location of the attachment that has been provided by the caller verbally and/or in text form.

Step 30 may include the voice-mail system confirming the attachment location or address that is provided by the caller by audibly replaying the location or address to the caller and requesting confirmation by verbal or keypad acknowledgement from the caller. Upon receiving either a verbal or keypad confirmation from the caller, the voice-mail system may determine the type of content in the attachment at the location provided by the caller or the attachment may include a self-defining content type. That is, the voice-mail system may determine if the content of the attachment is in, for example, any one of audio, video, text, programs, spreadsheets, graphic form or multimedia, for example, comprising both visual and audible portions. It is noted that the "programs", as used in the context of the present invention, include, but are not limited to, programs in machine-executable form and programs in source code form. The determination may be made by the service node 340 accessing the server 305 via the network 310 to retrieve the attachment file from the file storage 325. The network 310 may include the Internet, a WAN or a LAN.

Step 35 may continue by having the voice-mail system store the voice-mail message with the location of the attachment along with, optionally, an indication of the format of the attachment. In the alternative, step 35 may include the voice-mail system actually retrieving the attachment from the location entered by the caller and storing the voice-mail message along with the attachment. Although the present invention is in no way limited, the alternative implementation of step 35 is most likely to be implemented when the attachment stored at the identified location is an audio file or a text file that is converted to speech. Such implementation may also include retrieving the audio portion of a video file attachment, obtaining or providing an audible description of the video or converting an embedded graphic in a text document to a speech description. In such instances, an audio file, converted video or graphics file or converted text file or combination file may be attached to the voice-mail message in order to provide easier access thereto for the voice-mail system subscriber upon retrieval. In an alternative embodiment, the caller or a voicemail recipient (e.g., the voice-mail subscriber) may decide if video or graphics conversion to speech is necessary or desirable. Further, such implementation is dependent upon the voice-mail system configuration that may be set by default or by the capabilities of the terminal of the voice-mail subscriber that may be ascertained from a subscriber profile.

The user may then be presented with the automated message that offers the option of leaving another attachment, as in step 20. If the calling party does not desire or intend to leave another attachment, the call may be terminated, as in step 40. Otherwise, the processing may continue at step 25, as described above, and may further continue until the calling party does not desire or intend to leave any further attachments to the voice-mail message.

As an alternative embodiment, the caller may also use a computer, PDA, or similar device in conjunction with the telephone to leave a voice-mail message with an attachment. As set forth above, the audio portion of a voice-mail message is left using a telephone. At step 25 of FIG. 2, the user may use a keypad on a personal computer (PC) to enter the information to identify the attachment. The PC, with its input, may be correlated with the telephone by the voice-mail system keeping a table of corresponding telephone numbers and PC user identification information. Alternatively, the caller may send an Instant Message (IM) to the SN 340 to thus identify the attachment to the voice-message. The caller's user identification information associates the IM with his or her telephone number. The caller's user ID may also be included in the IM.

Figure 3:
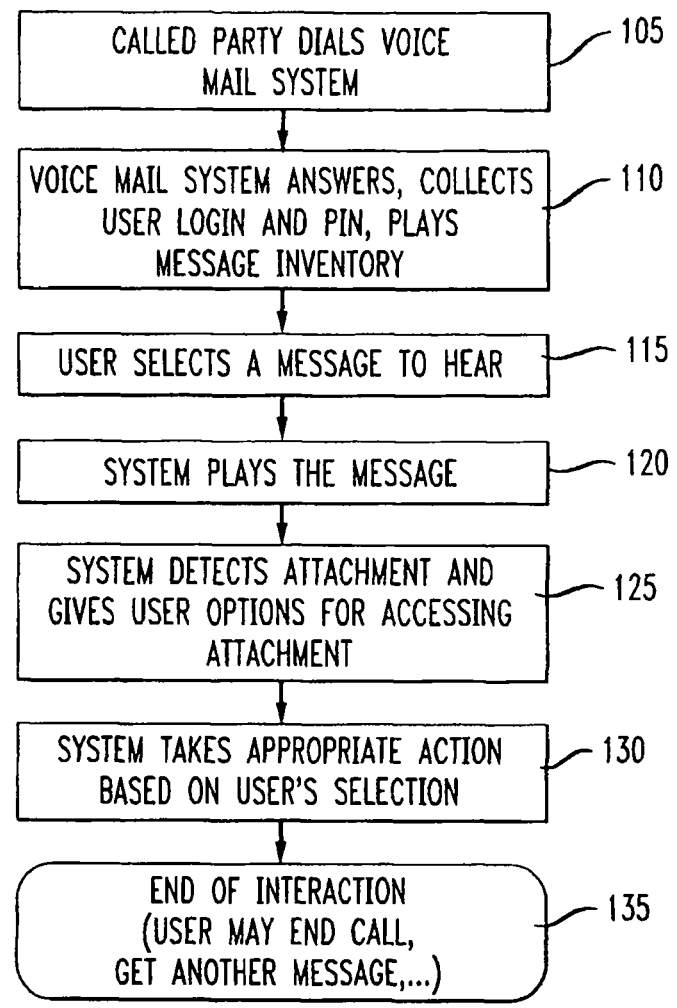
FIG. 3 is a flowchart showing the process for retrieving a message according to an example embodiment of the present invention.

Implementation of the present invention may further include retrieval of voice-mail messages with attachments, as shown in FIG. 3 and further reference to FIG. 1.

In step 105, the called party may begin to retrieve his or her voice-mail messages by calling the voice-mail system using the telephone 300, which may include any one of a wired telephone, a wireless telephone, a computer or any handheld terminal capable of telephone operations. In step 10, the called party may enter his/her login information, including a PIN (personal identification number), and receive an inventory of messages. The message inventory may include an indication of the number of new messages as well as the number of previously stored messages. Further, the inventory may identify which messages include an attachment, the location of the attachment or the address of the attachment and, further still, identify the content type of such attachment(s). Meanwhile, a network system in accordance with the present invention may retrieve a user profile including user terminal capability and verify that the user is entitled to use the network service.

Step 115 may include the step in which, as is known in the field of voicemail systems, the user may enter either a verbal or keypad command, as described above, to retrieve messages for playback, and such messages are played back in step 120. If an attachment to a respective voice-mail message has been entered by the caller, as described above, the playback of the respective voice-mail message may conclude, or alternatively begin, with an additional message component that may indicate the presence of an attachment (which was stored by the voice-mail system when provided by the caller or was pointed to when the caller provided the location of the attachment). The attachment may optionally require of the voice-mail recipient yet another entry of a security credential, which may include but is not limited to a PIN, for security purposes. That is, access to the attachment may include security precautions beyond those for accessing the voice-mail message. The attachment may further optionally include at least one of the type of attachment and the size of the attachment. Further, the playback of the respective voice-mail message may include options for the called party to choose the means by which the attachment is retrieved. The playback options for the called party may include, but are in no way limited to, having the attachment played back audibly immediately, forwarded to the called-party's e-mail account, transmitted to a designated facsimile machine, or the content of the attachment may be transmitted to a computer terminal, whether stationary or mobile, designated by a given network address. The choice among the playback options is made by the called party by entering the designation either verbally or by using one of the keypads described above. In the alternative, the voicemail system may provide an address of where the attachment may be accessed, either immediately or at a future time.

That is, there are no limitations to the permutations by which the voice-message attachment may be transmitted to the voice-mail system subscriber. That is, for example, upon request by the subscriber, audio, video, text, programs, spreadsheets, and graphic attachments may be transmitted by e-mail; text, programs, spreadsheets, and graphic attachments may be transmitted by facsimile; audio, video, text, programs, spreadsheets, and graphic attachments may be transmitted in real time to a computer screen, mobile telephone, PDA or other handheld device by which the voice-mail subscriber has accessed the voice-mail system.

An attachment may be in the form of an electronic document having multiple portions that include separate and distinct types of information. For example, a document or other file that is created with a word-processing program may include portions that include textual and graphics information, that is, portions that include graphical information such as drawings or photographs, and portions that include video and audio information. The portions not in audible form can be converted to speech or already converted portions included at the user's choice. Similarly, documents written in markup languages (e.g., HTML, XML, SGML) may interleave textual information with elements that describe the document structure or the visual presentation. All such documents and multimedia files may be referred to herein as "compound documents". Textual information and data converted from video or graphical form to speech in such compound documents may be represented or stored in intermediate file code in various ways, including ASCII coding, Unicode or a proprietary code, and may be subjected to additional processing such as compression or encryption.

According to the present invention, compound documents may be included as attachments to voice-mail messages. Such attachments may be presented to voice-mail system subscribers who may only have access to a telephone by extracting portions that include audio information, portions that include textual information converted to audio form, audible descriptions of graphics and video, and audible representations of multimedia files generally. Then, any extracted textual or visual information may be converted into audio form using a known text-to-speech or other conversion methodology, and providing an audio playback of the converted information. As an example, if the attachment to the voice-mail message includes a movie clip, it may be possible to transmit only the audio portion thereof and/or a description of the video scene and action. Similarly, if the attachment includes a word processing document including an embedded graphics file or a document in a markup language, the attachment may be processed to extract the textual information portions, which may then be transmitted to the voice-mail system subscriber by any of the means previously described or to additionally provide speech descriptions of any embedded graphics.

A further playback option for the voice-mail attachment may include allowing the called party to navigate through the attachment to select only desired items to be read back during the message retrieval. Such voice-commands for navigating through a document, which may include commands such as "next paragraph" or "down two rows", are known in the art for creating new documents, and may be found in programs that provide speech-to-text capabilities.

Step 130 may include a wide range of processing in accordance with the called party's selections from step 125. Among the processing included in step 130, service node 340 may retrieve the attachment file based on the location or address that is attached to the voice-mail message that was entered by the calling party. The service node 340 may retrieve the attachment file by interacting with the server 305, via the network 310, and then accessing the file storage 325.

Again, depending upon the voice-mail system configuration that is set by default or by the voice-mail subscriber, as well as the designated means for accessing the attachment file, the retrieved attachment file may be played back audibly immediately, forwarded to the called-party's e-mail account, transmitted to a designated facsimile machine, or transmitted to a computer terminal designated by a given network address. For example, if the attachment file is text, then text-to-speech software in the voice-mail system may convert the attachment file to speech for immediate audio playback to the called party. Audio attachment files may be similarly played back to the called party. Further, video or graphic attachment files may be forwarded to the called party's computer 320, which may be a personal computer or a mobile terminal, via the network 310 and Internet service provider 315 or alternatively described to the user via video or graphics to speech conversion technology. Similarly, text and graphic attachment files may be sent to a facsimile machine using the same line as telephone 300 after the user has ended the message retrieval operation and hung up the phone, or to a facsimile machine on a separate telephone line.

As a result, attachments are no longer an option only for e-mail transmissions. Telephone voice-mail systems may now provide access to such attachments regardless of their format.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

The invention claimed is:
1. A method comprising:
receiving a request from a called party to play a selected voice message stored in a voice mail message store;
retrieving the selected voice message from the voice mail message store;
playing the selected voice message to the called party;
determining that an attachment stored in an attachment store separate from the voice mail message store is associated with the selected voice message;
indicating to the called party that there is an attachment associated with the selected voice message;
receiving input from the called party requesting access to the attachment associated with the selected voice message;

retrieving the attachment associated with the selected voice message from the attachment store in response to the receiving input; and transmitting the attachment associated with the selected voice message to the called party via email in response to the receiving the input.

2. The method of claim 1 further comprising:

indicating to the called party a content type of the attachment associated with the selected voice message.

3. The method of claim 1, wherein the attachment store is a private document storage system.

4. The method of claim 1, further comprising:

determining that the attachment associated with the selected voice message is a text file;

converting the text file to speech to generate a converted text file; and playing the converted text file to the called party.

5. The method of claim 1 further comprising:

requesting a security credential in response to the receiving input from the called party requesting access to the attachment associated with the selected voice message, wherein the transmitting the attachment associated with the selected voice message is in response to determining the security credential to be valid.

6. The method of claim 1 further comprising:

transmitting the attachment associated with the selected voice message to a computer of the called party in response to the receiving the input.

7. The method of claim 1 further comprising:

transmitting the attachment associated with the selected voice message to a facsimile machine in response to the receiving the input.

8. A method comprising:

receiving, at a voice mail system, a request from a called party to play a selected voice message stored in a voice mail message store of the voice mail system;

retrieving the selected voice message from the voice mail message store of the voice mail system;

playing the selected voice message to the called party;

determining, at the voice mail system, that an attachment stored in an attachment store associated with the voice mail system and separate from the voice mail message store is associated with the selected voice message;

indicating to the called party that there is an attachment associated with the selected voice message;

receiving input from the called party requesting access to the attachment associated with the selected voice message;

retrieving the attachment associated with the selected voice message from the attachment store associated with the voice mail system in response to the receiving input; and transmitting the attachment associated with the selected voice message to the called party via email in response to the receiving the input.

9. The method of claim 8 further comprising:

indicating to the called party a content type of the attachment associated with the selected voice message.

10. The method of claim 8, wherein the attachment store associated with the voice mail system is a private document storage system.

11. The method of claim 8 further comprising:

determining that the attachment associated with the selected voice message is a text file;

converting the text file to speech to generate a converted text file; and playing the converted text file to the called party.

12. The method of claim 8 further comprising:

requesting a security credential in response to the receiving input from the called party requesting access to the attachment associated with the selected voice message, wherein the transmitting the attachment associated with the selected voice message is in response to determining the security credential to be valid.

13. The method of claim 8 further comprising:

transmitting the attachment associated with the selected voice message to a computer of the called party in response to the receiving the input.

14. The method of claim 8 further comprising:

transmitting the attachment associated with the selected voice message to a facsimile machine in response to the receiving the input.

15. A method for operating a voice mail system, the method comprising:

receiving a request from a party to play a specific voice message stored in a voice mail message store of the voice mail system;

retrieving the specific voice message from the voice mail message store of the voice mail system;

playing the specific voice message to the party;

determining, at the voice mail system, that a particular attachment stored in an attachment store associated with the voice mail system and separate from the voice mail message store is associated with the specific voice message;

indicating to the party that there is an attachment associated with the specific voice message;

receiving input from the party requesting access to the particular attachment associated with the specific voice message;

retrieving the particular attachment associated with the specific voice message from the attachment store in response to the receiving input; and transmitting the particular attachment associated with the specific voice message to the party via email in response to the receiving the input.

16. The method of claim 15 further comprising:

indicating to the party a content type of the particular attachment associated with the specific voice message.

17. The method of claim 15, wherein the attachment store associated with the voice mail system is a private document storage system.

18. The method of claim 15 further comprising:

determining that the particular attachment associated with the specific voice message is a text file;

converting the text file to speech to generate a converted text file; and playing the converted text file to the party.

19. The method of claim 15 further comprising:

requesting a security credential in response to the receiving input from the called party requesting access to the attachment associated with the selected voice message, wherein the transmitting the attachment associated with the selected voice message is in response to determining the security credential to be valid.

20. The method of claim 15 further comprising:

transmitting the particular attachment associated with the specific voice message to a computer of the party in response to the receiving the input.

* * * * *